United States Patent
Nair

(10) Patent No.: US 10,990,120 B2
(45) Date of Patent: Apr. 27, 2021

(54) LOW LATENCY FIFO WITH AUTO SYNC

(71) Applicant: Advanced Micro Devices, Inc., Santa Clara, CA (US)

(72) Inventor: Bhuvanachandran K. Nair, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 120 days.

(21) Appl. No.: 16/452,869

(22) Filed: Jun. 26, 2019

(65) Prior Publication Data
US 2020/0409408 A1 Dec. 31, 2020

(51) Int. Cl.
*G06F 1/12* (2006.01)
*G06F 1/10* (2006.01)
*G06F 1/06* (2006.01)
*G06F 9/54* (2006.01)

(52) U.S. Cl.
CPC .......... *G06F 1/12* (2013.01); *G06F 1/06* (2013.01); *G06F 1/10* (2013.01); *G06F 9/544* (2013.01)

(58) Field of Classification Search
CPC ..... G06F 1/12; G06F 1/06; G06F 1/10; G06F 9/544
See application file for complete search history.

(56) References Cited

U.S. PATENT DOCUMENTS

| 2006/0277329 A1* | 12/2006 | Paulson | G06F 5/10 710/39 |
| 2013/0254583 A1* | 9/2013 | Rifani | G06F 13/4291 713/400 |
| 2017/0250695 A1* | 8/2017 | Lee | H03L 7/091 |

* cited by examiner

*Primary Examiner* — Stefan Stoynov
(74) *Attorney, Agent, or Firm* — Polansky & Associates, P.L.L.C.; Paul J. Polansky; Nathan H. Calvert

(57) ABSTRACT

A method operates a first-in-first-out (FIFO) buffer with a first clock, and operates one of a read pointer or a write pointer of the FIFO buffer with the first clock while operating the other one of the read pointer or write pointer with a second clock. One of a serializer fed from the FIFO buffer output, or a de-serializer feeding the FIFO buffer input, is operated with the second clock. Timing pulses indicate that the pointer operating with the second clock has reached a predetermined point in its cycle. The phase of the second clock is adjusted based on a relationship between the timing pulses and an advance period of the pointer operating with the first clock. The pointer operating with the first clock is reset to achieve a desired value for the relationship. A skew created from adjusting the phase of the second clock is corrected.

20 Claims, 6 Drawing Sheets

LOW LATENCY FIFO WITH AUTO SYNC

BACKGROUND

When first-in-first-out buffers (FIFOs) are used to transfer data between two clock domains, the data is transferred from one domain to other by delaying the data unload until the load is completed and the data is settled. For reliability, this process should make sure that the load and unload addresses have enough separation or delay in time between them. If sufficient time separation is not given, it can cause a malfunction. However, if this process creates excessive delay, it deleteriously affects the latency through the interconnect. Also, in a multi-lane interconnect, inter-lane skew will add additional timing uncertainty to the entire link. Often, it is not possible to predict these delays since uncertainties depend on process, voltage and temperature on top of specific implementations of the physical layer components' clocking scheme that might include uninitialized, but free running clock dividers.

In order to ensure proper functionality, existing implementations use a programmable FIFO pointer separation scheme in which a suitable delay value is selected by characterizing the system across applicable operating conditions and integrated circuit manufacturing corners to find a delay setting that works across all conditions and corners. This fixed setting is then used for production. Some other solutions characterize individual system-on-chips (SoCs) and permanently fuse the setting on each SoC. The former solution is cumbersome and can lead to sub-optimal settings and deeper FIFOs, increasing the latency, while the latter solution often adds expense due to increased tester time and use of fuse bits.

Figure 1:
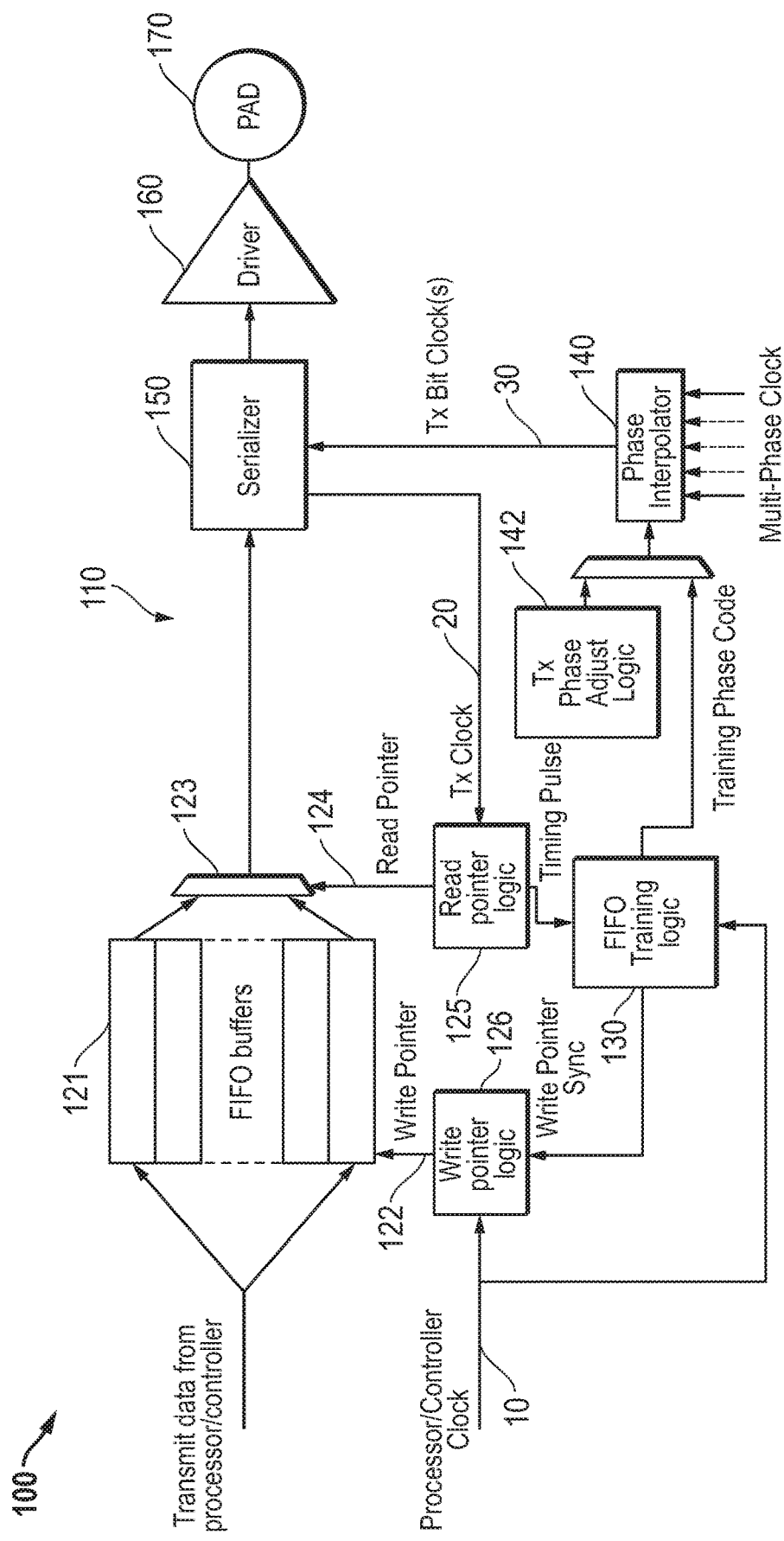
FIG. 1 shows in block diagram form a FIFO buffer transmit path according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A first-in-first-out (FIFO) buffer circuit for operating in two clock domains includes a parallel buffer, a serializer circuit, a clock phase adjustment circuit, and a FIFO training logic circuit. The parallel buffer has a write pointer cycling through the parallel buffer according to a first clock, a read pointer cycling through an output of the parallel buffer according to a second clock, and a pulse generation circuit generating timing pulses at a predetermined point of the read pointer's cycle. The serializer circuit is coupled to the output of the parallel buffer and operates with the second clock. The clock phase adjustment circuit is operable to adjust a phase of the second clock. The FIFO training logic circuit receives the timing pulses from the pulse generation circuit and, based on a relationship between the timing pulses and an advance period of the write pointer, sends a control signal to the clock phase adjustment circuit to adjust the phase of the second clock, and sends a write pointer sync signal to reset the write pointer to achieve a desired value for the relationship. It then corrects a skew caused by adjusting the phase of the second clock.

A method of operating FIFO buffer across two clock domains includes operating the FIFO buffer with a first clock, operating one of a read pointer and a write pointer of the FIFO buffer with the first clock, and operating the other one of the read pointer and write pointer with a second clock. One of a serializer fed from an output of the FIFO buffer, and a de-serializer feeding an input of the FIFO buffer, is operated with the second clock. While operating the FIFO buffer, the method transmits timing pulses indicating that the pointer operating with the second clock has reached a predetermined point in its cycle. The method adjusts the phase of the second clock based on a relationship between the timing pulses and an advance period of the pointer operating with the first clock, and resets the pointer operating with the first clock to achieve a desired value for the relationship. A skew created from adjusting the phase of the second clock is corrected.

A FIFO buffer circuit for operating in two clock domains includes a parallel buffer, a de-serializer circuit, a clock phase adjustment circuit, and a FIFO training logic circuit. The parallel buffer has a read pointer cycling through the parallel buffer according to a first clock, a write pointer cycling through an input of the parallel buffer according to a second clock, and a pulse generation circuit generating timing pulses at a predetermined point of the write pointer's cycle. The de-serializer circuit is coupled to the input of the parallel buffer and operates with the second clock. A clock phase adjustment circuit adjusts a phase of the second clock. The FIFO training logic circuit receives the timing pulses from the pulse generation circuit and, based on a relationship between the timing pulses and an advance period of the read pointer, sends a control signal to the clock phase adjustment circuit to adjust the phase of the second clock, and sends a read pointer sync signal to reset the read pointer to achieve a desired value for the relationship. It then corrects a skew caused by adjusting the phase of the second clock.

FIG. 1 shows in block diagram form a FIFO buffer transmit path 100 according to some embodiments. Generally, the FIFO synchronization mechanism herein adjusts the timing of a pulse that indicates the pointer position in one domain and using the adjusted pulse signal to set or initialize the pointer on the second domain. A closed loop control scheme determines the synchronization point and decides when to set the pointer on the second domain. For a multi-lane link, often the input-output (I/O) side high-speed clocking (the bit clock) will be implemented as a tightly controlled low skew tree. In order not to introduce any additional skew due to the synchronization related adjustments, a de-skew adjustment is applied where individual I/O bit clocks are put back to their default positions. An example implementation that for a high-speed memory I/O physical layer is explained in the following sections.

Transmit path 100 includes a first-in-first-out (FIFO) buffer circuit 110 for operating in two clock domains, connected to a driver 160 which drives a transmit signal to an output pad 170.

FIFO buffer circuit 110 includes a parallel buffer 121 with a write pointer 122 cycling through the registers of parallel buffer 121 according to a processor/controller clock ("Pclk") 10. A multiplexer 123 receives the output of parallel buffer 121 and cycles through the output according to a read pointer 124 to select the buffer data to be read and output from multiplexer 123. The output of multiplexer 123 is fed to serializer circuit 150 which prepares the signal form transmission by driver 160 on output pad 170.

Read pointer 124 operates with according to a transmission clock ("Txclk") 20, which may have a different nominal speed from Pclk 10 or may have the same nominal speed. Read pointer 124 is generated by read pointer logic 125 controlling the cycling of read pointer 124. Read pointer logic 125 operates according to Txclk 20. Read pointer logic 125 includes a pulse generation circuit (not shown in FIG. 1) which generates timing pulses at a predetermined point of read pointer 124's cycle, typically at the zero point. These timing pulses are preferably the width of one Txclk 20 period and are sent to FIFO training logic 130 for use in synchronizing the FIFO buffer as further discussed below.

A clock phase adjustment circuit operable to directly or indirectly adjust the clock phase of Txclk 20. In this embodiment, the clock phase adjustment circuit is a phase interpolator 140. However, any suitable circuit for adjusting a clock phase may be used. Phase interpolator 140 is selectably controlled by a Tx phase adjustment logic circuit 142, which performs adjustments based on link measurements during normal operation, or by a control signal from a FIFO training logic circuit 130 during a training phase. Txclk 20 is based on a Tx bit clock ("Txbit clock") 30, which is the clock used for driver 160 to time the bit transmission. Phase interpolator 140, in this embodiment, adjusts the phase of Txclk 20 indirectly through adjusting the phase of Txbit clock 30. Other embodiments may include direct adjustment.

In this embodiment, write pointer logic 126 operates on the pclk 10 domain and read pointer logic 125 operates on the Txclk 20. Txclk 20 and Txbit clock 30 are meso-current with Pclk 20, that is, while their nominal frequencies are related by integer multiples, they may be out of phase due to different operating conditions in the different clock trees. Typically, Txclk 20 and Txbit clock 30 are run at nominal frequencies that various integer multiple frequencies of the Pclk 20 frequency, depending on the implementation of serializer 150 and the transmission speed of driver 160. For example, an implementation for a graphics double data rate type six (GDDR6) FIFO buffer circuit 110 has a Txclk 20 that runs at double the rate of Pclk 10, and a Txbit clock 30 that runs at eight times the frequency of Pclk 10.

FIFO training logic circuit 130 receives the timing pulses from the pulse generation circuit of read pointer logic 125. In operation, FIFO training logic circuit 130 measures a relationship between the timing pulses and the advance period of the Read pointer, and based on the relationship, sends a control signal to the clock phase adjustment circuit to adjust the phase of Txclk 20. As further described below, FIFO training logic circuit 130 iteratively adjusts the measured relationship through an error correction loop that moves the phase position of Txclk 20. When the measured relationship reaches a desired state, a zero error point is reached in the synchronization of the read and write pointers. That this point, FIFO training logic 130 sends a Write pointer sync signal to write pointer logic 126 causing it to reset the write pointer 122 to be synchronous to read pointer 124. It then corrects the skew caused by adjusting the phase of Txclk 20, as further described below.

Figure 2:
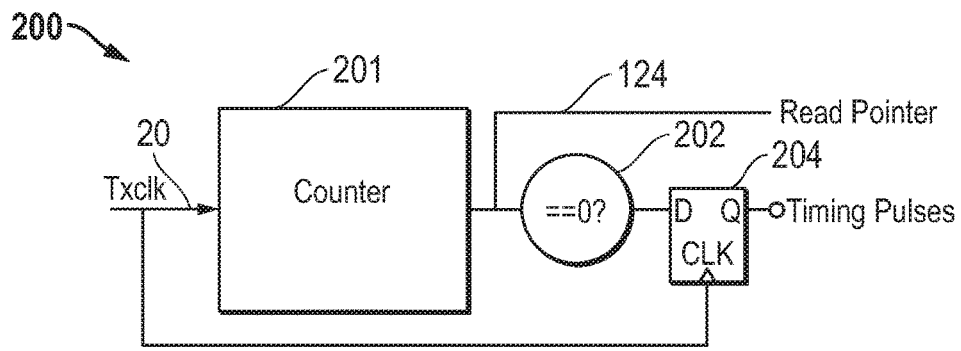
FIG. 2 illustrates in block diagram form a pulse generation circuit according to some embodiments.

FIG. 2 illustrates in block diagram form a pulse generation circuit 200 according to some embodiments. Pulse generation circuit 200 is driven by the Txclk 20. As depicted, read pointer 124 is generated by a counter 201 with a cycle size that is the same as the size of the FIFO buffer 121. Pulse generation circuit 200 includes a comparator 202 receiving the output of counter 201, the read pointer value, and producing a pulse when the read pointer reaches a specified value (in this example, zero). The resulting pulse is registered with flip flop 204 to hold the pulse high for a single period of the Txclk 20. The depicted implementation uses '0' as the specified value of the read pointer, allowing the comparator to be implemented as a NOR gate.

Figure 3:
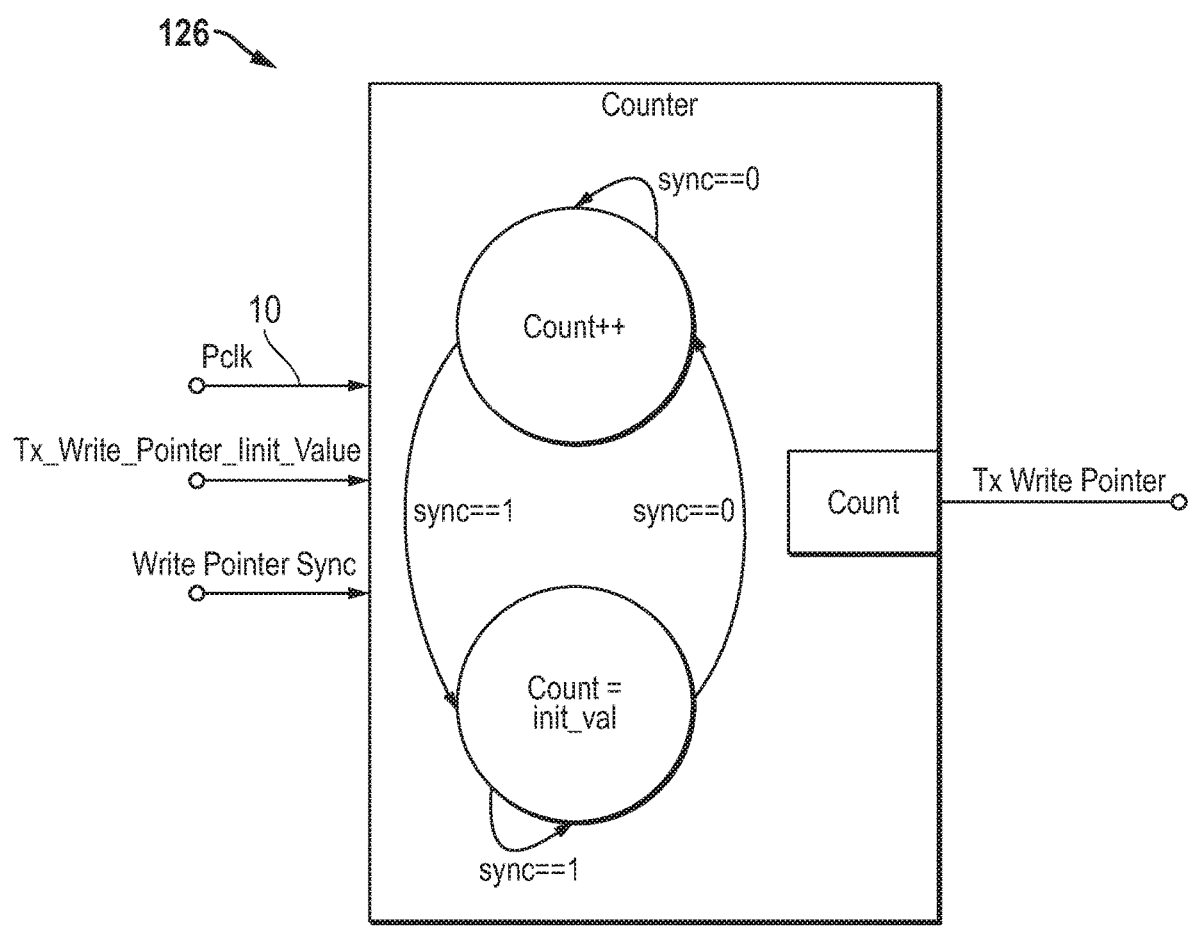
FIG. 3 illustrates in mixed circuit and state diagram form write pointer logic according to some embodiments.

FIG. 3 illustrates in mixed circuit and state diagram form write pointer logic 126 according to some embodiments. Write pointer logic 126 is driven by pclk 10 and includes a counter which cycles through a count up to the size of the FIFO buffer 121. Write pointer logic 126 generally uses the Write pointer sync signal produced by read pointer logic 125 as an initialization pulse that will set the write pointer counter to a programmable initialization value received by write pointer logic 126 and labelled tx_write_pointer_linit_value. This value can be set based on known system parameters that affect clock drift during normal operation of FIFO buffer 121.

As shown in the state diagram, the write pointer counter is in an active state if the Write pointer sync signal is zero (LOW), counting to provide the write pointer value as an output labelled 'Tx write pointer'. If the Write pointer sync signal changes to one (HIGH), the write pointer counter changes state to the initialization value, and holds that value until the Write pointer sync signal changes to a value of zero (LOW).

Figure 4:
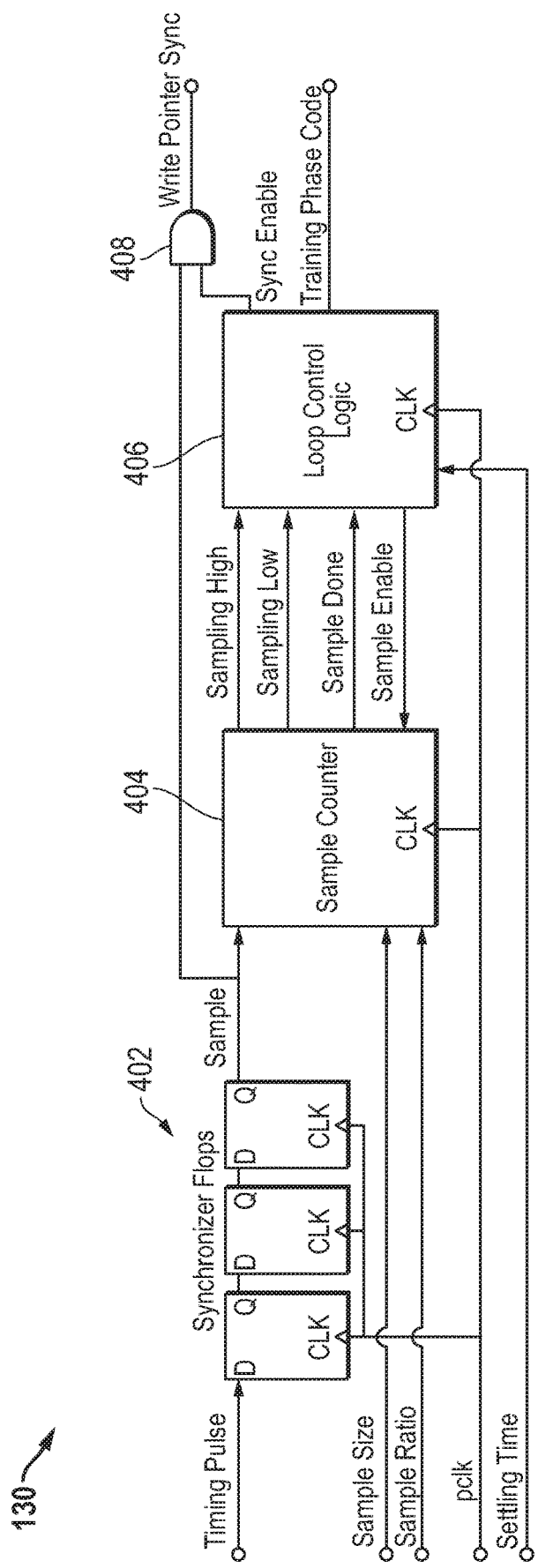
FIG. 4 illustrates in block diagram form an implementation of FIFO training logic circuit of FIG. 1 according to some embodiments.

FIG. 4 illustrates in block diagram form an implementation of FIFO training logic circuit 130 of FIG. 1 according to some embodiments. FIFO training logic circuit 130 runs synchronously with Pclk 10. The timing pulses generated by read pointer logic 125 are received on an input, which is fed to a multi-stage synchronizer flop chain 402. The resulting output signal from multi-stage synchronizer flop chain 402, labeled 'sample', is fed into a sample counter 404. Sample counter 404 is incremented at the rising edge of Pclk 10 when the sample signal is high. The counting continues for a duration set by 'sample size' parameter received as an input to sample counter 404. Sample counter 404 operates to calculate the duration set by the parameter 'Sample Ratio', also received as an input to sample counter 404. The Sample Ratio is set based on the frequency of the timing pulses and the desired relationship of the timing pulses and the advance period of write pointer 122 (FIG. 1). That is, sample counter 404 operates to count how many timing pulses are received during the sampling period between increments of write pointer 122. At the end of the sampling period, sample counter 404 outputs a 'sample done' pulse and feeds it to loop control logic 406. At this point, if the count of sample counter 303 matches the sample size, sample counter 404 generates a signal 'sampling high' and feeds it to loop control logic 406. Sampling counter 404 may also generate an opposite signal 'sampling low' and feed it to loop control logic 406 to indicate that the sample counter is consistently sampling a low value.

Loop control logic 406 operates to produce a 'sync enable' signal, which is fed to AND gate 408 along with the sample signal. The output of AND gate 408 is the write pointer sync signal which is fed to write pointer logic 126 (FIG. 1) to reset write pointer 122 to be synchronous to read pointer 124, as further discussed below. Loop control logic 406 also generates the 'Training Phase Code' signal, which is a control signal fed to phase interpolator 140 (FIG. 1). Generally, loop control logic 406 produces the sync enable and Training Phase Code signals in response to the sample done and sampling high signals, as further described with respect to FIG. 5. Loop control logic 406 also produces a 'sample enable' signal which it feeds to sample counter 404. This signal causes sample counter 404 to be held in reset, allowing sample counter 404 to ignore the samples during a phase error adjustment settling time after a phase adjustment is made with the Training Phase Code signal. The settling time used in producing the sample enable signal is adjustable based on a 'Settling Time' input received by loop control logic 406.

Figure 5:
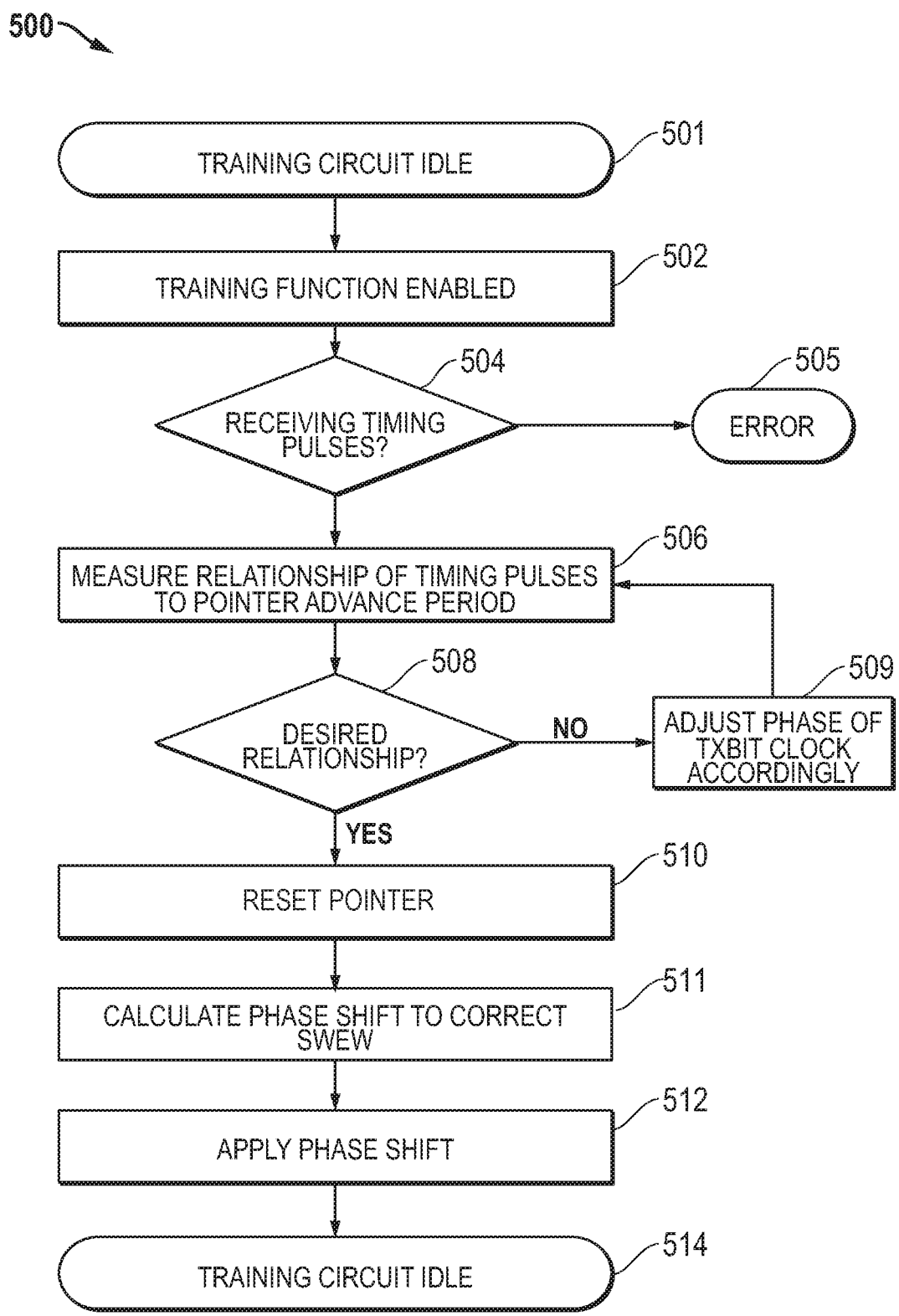
FIG. 5 illustrates in flow diagram form an example process for operating a FIFO training logic circuit.

FIG. 5 illustrates in flow diagram form an example process 500 for operating FIFO training logic circuit 130. Process 500 may be performed under control of loop control logic 406 of FIG. 4, for example. Generally, FIFO training logic circuit 130 enters a training phase in which it repeatedly measures the relationship between the timing pulse and the advance period of the read pointer and repeatedly sends the control signal 'Training Phase Code' to adjust the phase of Txclk 20 (FIG. 1) until a desired relationship is achieved.

Process 500 starts at block 501, where it remains in IDLE state in which no operations are performed as long as FIFO training logic circuit 130 is held in idle. The FIFO training logic circuit is enabled at block 502. This enablement is preferably automatic when the transmit or receive link is reset, and may also be enabled in response to other conditions on the link such as error conditions. When FIFO training logic circuit 130 is enabled at block 502, process 500 transitions to a searching state at block 504 where it determines if it is receiving timing pulses. If a timeout period expires without receiving timing pulses, process 500 goes to block 505 where an error state is entered.

If timing pulses are received at block 504, process 500 goes to a synchronization state at block 506 where it measures a relationship of the timing pulses to the advance period of the write pointer (the duration that the write pointer holds a value before advancing). This relationship may be measured directly or indirectly. In the example of FIG. 4, the relationship is measured indirectly by the sample counter, which counts the number of timing pulses received to determine if the desired relationship indicated by the sample ratio signal is achieved at block 508. In this implementation, upon every sample done indicator, block 509 adjusts the phase of Txclk 20 by decrementing the 'training phase code' that determines the position of phase interpolator 140. This adjustment will advance the pulse position.

Each time the phase is adjusted, block 509 activates a delay counter that compensates for the phase adjustment settling time and negates the Sample enable signal until the phase adjustment has settled. When the delay timer expires, the sampling is enabled by asserting the Sample enable signal. During the synchronization state which includes the loop of blocks 506, 508, and 509, the 'sync enable' signal (FIG. 4) is asserted in response to the assertion of the Sample done signal, which allows the sample signal to be sent to write pointer logic 126 as the Write Pointer Sync signal as shown at block 510. For a receive FIFO buffer such as that of FIG. 8, the read pointer is reset rather than the write pointer. The loop continues until the phase is adjusted enough that at least one 'sample done' signal is produced by sample counter 404. In some other embodiments, at least two 'sample done' signals are used, resulting in at least two write pointer sync pulses being sent to write pointer logic 126 (block 510 may be repeated as part of the depicted loop). An example of the resulting signals may be seen in FIG. 6 below.

After the write pointer is reset at least once at block 510, the process transitions to block 511 where it enters a deskew state, and the 'sync enable' is de-asserted. In the deskew state, process 500 corrects the skew introduced by the phase adjustments made in the sync state. In this version, the correction is accomplished by calculating the amount of phase shift required correct the skew introduced by the phase adjustments made in the sync state. In the implementation of FIG. 1, the calculation includes determining how much phase shift is needed to place the Txbit clock 30 back to its original position relative to the read pointer cycle. For example, the calculation is based on the amount of phase code adjustment that corresponds to one full cycle of Txbit clock 30 by using the operator mod(P,N), in which N is the number of steps that covers a bit clock and P is the final position of accumulated phase adjustment steps made. Therefore, the final de-skew adjustment will be to round P up or down to the nearest multiple of N. This adjustment can eliminate skew introduced due to the adjustment of the tightly controlled skew of the higher-speed Txbit clock 30 clock tree to the less tightly controlled lower frequency Pclk 10 clock tree on which the sampling is done. Other versions may make a similar calculation based on Txclk 20. The calculated phase adjustment is applied at block 512.

At block 514, process 500 returns FIFO training logic circuit 130 to an IDLE mode for normal operation of the FIFO buffer circuit 110. Control of phase interpolator 140 is returned to Tx Phase Adjust Logic 142.

In the example implementation of FIG. 1, phase interpolator 140 is used for normal operation of the link, and the control process used therewith employs a phase interpolator for phase adjustment of the Write pointer sync pulse as well. Other implementations may employ different circuits for clock phase adjustments during link operation, and process 500 may be modified to suit such circuits.

While in this version the synchronization phase adjusts the phase of Txbit clock 30 in one direction to achieve the desired relationship, other versions may include a more complex adjustment. For example, in another embodiment, FIFO training logic circuit 130 enters a training phase in which it repeatedly measures the relationship between the timing pulses and the advance period of write pointer 122, and repeatedly sends the control signal until a range of Txclk 20 phase adjustments is determined. Then FIFO training logic 130 sends the control signal to adjust Txclk 20 to a desired point in the range.

Figure 6:
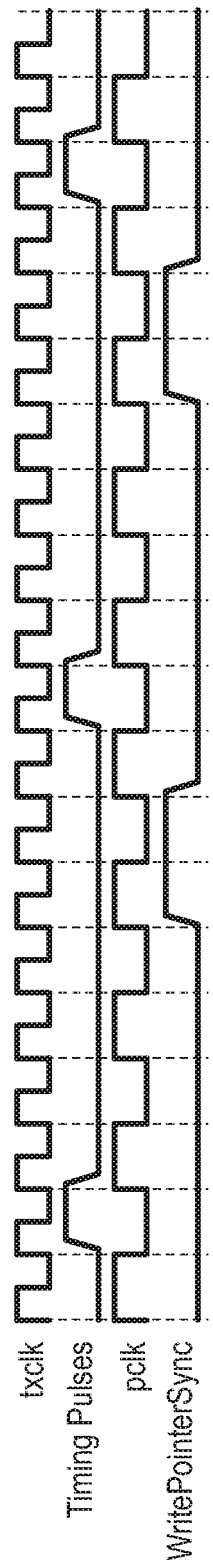
FIG. 6 illustrates a timing diagram showing the relationship of the write pointer sync signal to the timing pulses and clocks according to one embodiment.

FIG. 6 illustrates a timing diagram 600 showing the relationship of the Write Pointer Sync signal to the timing pulses and clocks according to one embodiment. The various signals are shown with their transitions depicted over time (the horizontal direction). Txclk 20 signal on the top row has a frequency twice that of Pclk 10 on the third row. The timing pulses produced by read pointer logic 125 are shown on the second row, with an example offset position from the timing pulses resulting from the phase adjustment.

Figure 7:
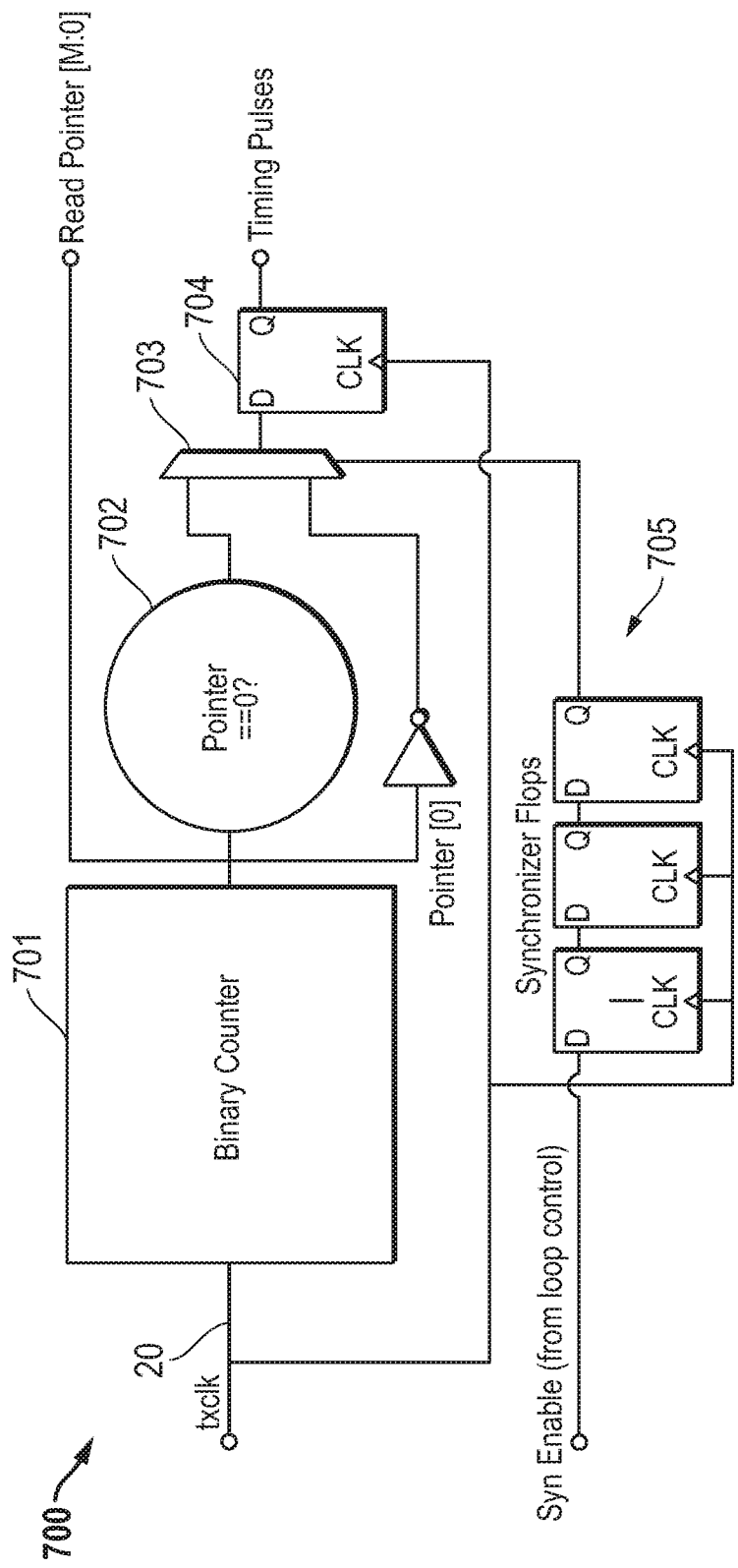
FIG. 7 illustrates in block diagram form another implementation of read pointer logic according to some embodiments.

FIG. 7 illustrates in block diagram form another implementation of read pointer logic 700 according to some embodiments. In this embodiment, the pulse spacing and latency of the timing pulses are modified to improve the training time budget. Read pointer logic 700 generally works like that of FIG. 2 during the synchronization phase of the training process. However, during the search phase of the training process, the timing pulse spacing is modified such that, instead of a timing pulse occurring once in every cycle of the Read Pointer counting through its entire count, the timing pulses occur more often. The modification is provided using the sync enable signal (FIG. 4), fed through a group of synchronizer flip-flops 705, to control a multiplexer 703. Multiplexer 703 has the output of comparator 702 fed to one of its inputs, and a logic signal Pointer[0], inverted, fed to the other input, such that the input to flip-flop 704 repeatedly creates timing pulses when the sync enable is low. This operation will provide a more frequent pulse train during search which can speed-up the search state of the control process. The pulse logic can be switched to operate normally (to pulse once in ever pointer cycle, such as at pointer==0) during the synchronization state of the control process. Read pointer logic 700 operates as described with respect to FIG. 5 after the search state. Other modifications may be used to change the spacing of the timing pulses.

While the above description provides a FIFO buffer 110 for a parallel-to-serial conversion (a FIFO buffer transmit path), the same principles are applied in a serial-to-parallel FIFO buffer to implement a FIFO buffer receive path. The receive path is implemented by creating the timing pulses from the write pointer rather than the read pointer and applying the pointer synch signal to the read pointer rather than the write pointer, as depicted in FIG. 8.

Figure 8:
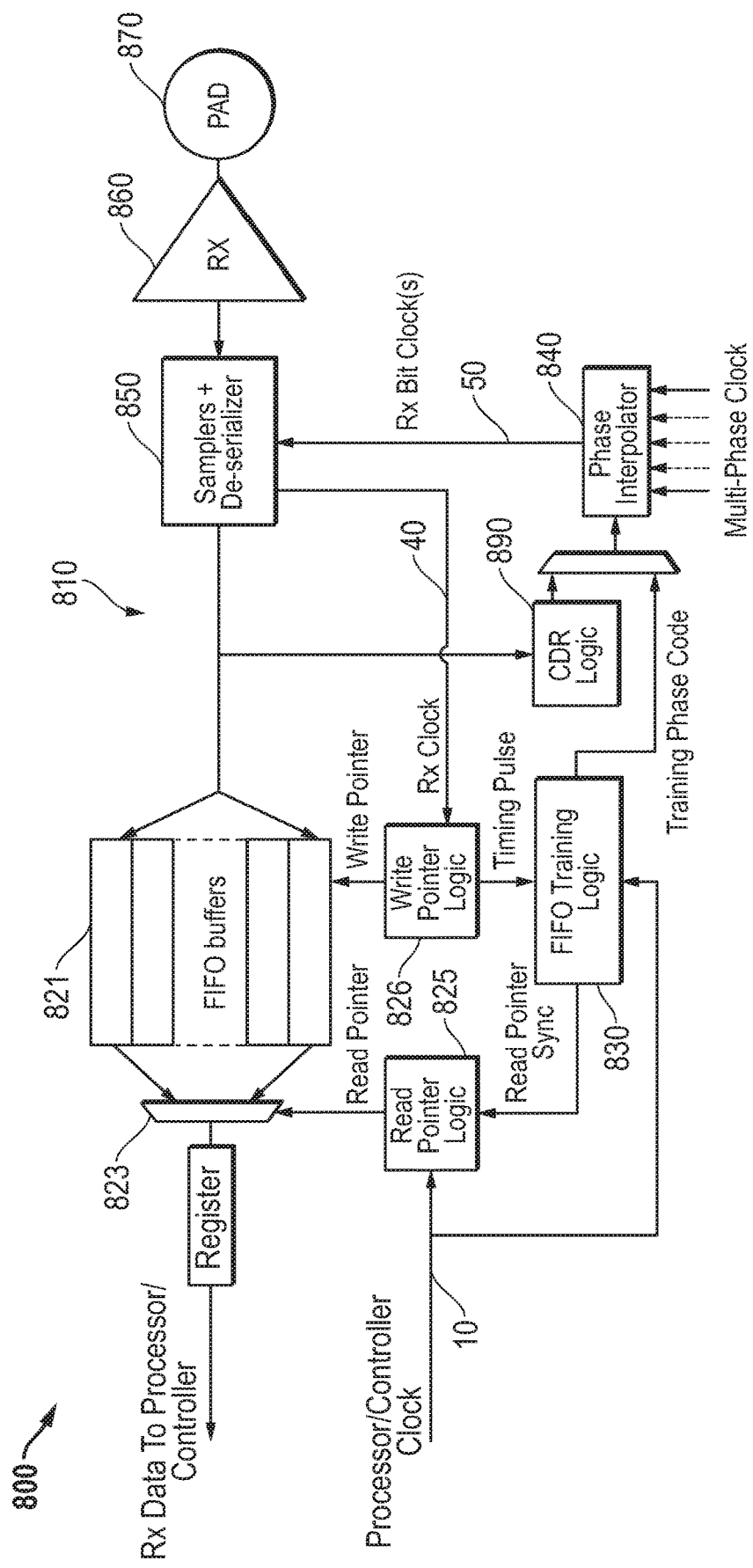
FIG. 8 shows in block diagram form a FIFO buffer receive path according to some embodiments.

FIG. 8 shows in block diagram form a FIFO buffer receive path 800 according to some embodiments. Receive path 800 includes a FIFO buffer circuit 810 for operating in two clock domains, connected to a receiver 160 which receives a serial signal from input pad 870. The received signal is fed to samplers/de-serializer 850, creating a parallel signal. The parallel signal is fed to a FIFO buffer 821.

Generally, the FIFO training logic 830 works like FIFO training logic 130, but with the pointers reversed. The similar portions are labelled like those of FIG. 1, but with reference numbers starting with "8" rather than "1", and the description thereof will not be repeated. Instead of the Tx phase adjust logic used in FIG. 1, receive path 800 employs clock data recovery (CDR) logic 890 in managing receive (Rx) bit clock 50 during normal link operation. During the training phase, FIFO training logic 830 takes over control of phase interpolator 840 to make the phase adjustments of Rx clock 40, indirectly through adjusting Rx bit clock 50. Other implementations may make direct phase adjustments to Rx clock 40.

The timing pulses produced by write pointer logic 826 are preferably the width of one period of Rx clock 40. The process of synchronizing read pointer logic 825 operates similarly to FIG. 5, because Rx clock 40 is meso-current with Pclk 10 and operates an at integer multiple frequency thereof.

FIFO training logic circuit 830 receives the timing pulses from the pulse generation circuit of write pointer logic 826, and, based on a relationship between the timing pulses and an advance period of the read pointer, sends a control signal 'training phase code' to phase interpolator 840 adjust the phase of Rx clock 40 (the adjustment is indirect in this embodiment, as discussed above). FIFO training logic 830 also sends a read pointer sync signal to reset the read pointer to be synchronous to the write pointer. It then corrects the skew caused by adjusting the phase of Rx clock 40.

The techniques herein may reduce or eliminate the need for the traditional characterization-based approach in synchronizing a FIFO buffer, while ensuring a predictive FIFO pointer separation and greatly improved latency. These techniques may also allow for reducing the depth of the buffer to save circuit area in some situations.

FIFO buffer transmit path 100 of FIG. 1, FIFO buffer receive path 800 of FIG. 8, or any portions thereof, such as FIFO training logic 130, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while transmit and receive paths are described, other FIFO buffers operating in two clock domains may also benefit from the techniques herein. Many different digital logic circuits are possible to achieve the functionality described for the read pointer logic, write pointer logic, and FIFO training logic described herein. Also, the techniques herein may be applied with many different methods of adjusting the phase of a clock.

Accordingly, it is intended by the appended claims to cover all modifications of the disclosed embodiments that fall within the scope of the disclosed embodiments.

What is claimed is:

1. A first-in-first-out (FIFO) buffer circuit for operating in two clock domains, comprising:
   a parallel buffer with a write pointer cycling through the parallel buffer according to a first clock, a read pointer cycling through an output of the parallel buffer according to a second clock, and a pulse generation circuit generating timing pulses at a predetermined point of the read pointer's cycle;
   a serializer circuit coupled to the output of the parallel buffer and operating with the second clock;
   a clock phase adjustment circuit operable to adjust a phase of the second clock; and
   a FIFO training logic circuit which receives the timing pulses from the pulse generation circuit and, based on a relationship between the timing pulses and an advance period of the write pointer, sends a control signal to the clock phase adjustment circuit to adjust the phase of the second clock, and sends a write pointer sync signal to reset the write pointer to achieve a desired value for the relationship, and then corrects a skew caused by adjusting the phase of the second clock.

2. The FIFO buffer circuit of claim 1, wherein the FIFO training logic circuit measures the relationship between the timing pulses and an advanced period of the read pointer.

3. The FIFO buffer circuit of claim 2, wherein the FIFO training logic circuit enters a training phase in which it repeatedly measures the relationship between the timing pulses and the advance period of the read pointer and repeatedly sends the control signal until a desired relationship is achieved.

4. The FIFO buffer circuit of claim 2, wherein the FIFO training logic circuit enters a training phase in which it repeatedly measures the relationship between the timing pulses and the advance period of the write pointer and repeatedly sends the control signal until a range of second clock phase adjustments is determined, and then sends the control signal to adjust the second clock phase to a desired point in the range.

5. The FIFO buffer circuit of claim 2, wherein the relationship is a predetermined count of the timing pulses within the advance period of the write pointer.

6. The FIFO buffer circuit of claim 1, wherein the FIFO training logic circuit calculates an amount of phase shift required to correct the skew created from adjusting the phase of the second clock.

7. A first-in-first-out (FIFO) buffer circuit for operating in two clock domains, comprising:
    a parallel buffer with a read pointer cycling through the parallel buffer according to a first clock, a write pointer cycling through an input of the parallel buffer according to a second clock, and a pulse generation circuit generating timing pulses at a predetermined point of the write pointer's cycle;
    a de-serializer circuit coupled to the input of the parallel buffer and operating with the second clock;
    a clock phase adjustment circuit operable to adjust a phase of the second clock; and
    a FIFO training logic circuit which receives the timing pulses from the pulse generation circuit and, based on a relationship between the timing pulses and an advance period of the read pointer, sends a control signal to the clock phase adjustment circuit to adjust the phase of the second clock, and sends a read pointer sync signal to reset the read pointer to achieve a desired value for the relationship, and then corrects a skew caused by adjusting the phase of the second clock.

8. The FIFO buffer circuit of claim 7, wherein the FIFO training logic circuit measures the relationship between the timing pulses and the advance period of the read pointer.

9. The FIFO buffer circuit of claim 8, wherein the FIFO training logic circuit enters a training phase in which it repeatedly measures the relationship between the timing pulses and the advance period of the read pointer and repeatedly sends the control signal until a desired relationship is achieved.

10. The FIFO buffer circuit of claim 8, wherein the FIFO training logic circuit enters a training phase in which it repeatedly measures the relationship between the timing pulses and the advance period of the read pointer, repeatedly sends the control signal until a range of second clock phase adjustments is determined, and then sends the control signal to adjust the second clock phase to a desired point in the range.

11. The FIFO buffer circuit of claim 8, wherein the relationship is a predetermined count of the timing pulses within the advance period of the read pointer.

12. The FIFO buffer circuit of claim 7, wherein the FIFO training logic circuit calculates an amount of phase shift required to correct the skew created from adjusting the phase of the second clock.

13. A method of operating a first-in-first-out (FIFO) buffer across two clock domains, comprising:
    operating a FIFO buffer with a first clock;
    operating one of a read pointer and a write pointer of the FIFO buffer with the first clock and operating the other one of the read pointer or write pointer with a second clock;
    operating one of a serializer fed from an output of the FIFO buffer, and a de-serializer feeding an input of the FIFO buffer, with the second clock;
    while operating the FIFO buffer, transmitting timing pulses indicating that the pointer operating with the second clock has reached a predetermined point in its cycle;
    adjusting the phase of the second clock based on a relationship between the timing pulses and an advance period of the pointer operating with the first clock and resetting the pointer operating with the first clock to achieve a desired value for the relationship; and
    correcting a skew created from adjusting the phase of the second clock.

14. The method of claim 13, further comprising, at a FIFO training logic circuit, measuring the relationship between the timing pulses and the advance period and sending a control signal to a clock phase adjustment circuit to perform the phase adjustment of the second clock.

15. The method of claim 14, further comprising placing the FIFO training logic circuit in a training state in which it repeatedly measures the relationship between the timing pulses and the advance period and repeatedly sends the control signal until a desired state of the relationship is achieved.

16. The method of claim 14, further comprising placing the FIFO training logic circuit in a training state in which it repeatedly measures the relationship between the timing pulses and the advance period, repeatedly sends the control signal until a desired range of second clock phase adjustments is determined, and then sends the control signal to adjust the second clock phase to a desired point in the range.

17. The method of claim 13, wherein the second clock operates meso-currently on an integer multiple frequency of the first clock.

18. The method of claim 13, wherein the relationship is a predetermined count of the timing pulses occurring within a single instance of the advance period.

19. The method of claim 13, wherein the relationship is a predetermined count of the timing pulses occurring within a designated fraction of the advance period.

20. The method of claim 13, further comprising, prior to resetting the pointer operating with the first clock, calculating an amount of phase shift required to correct the skew created from adjusting the phase of the second clock.

* * * * *